400
United States Patent [19]
Kahl

[11] 3,750,833
[45] Aug. 7, 1973

[54] AUTOMATICALLY STEERED SELF-PROPELLED VEHICLE

[75] Inventor: Eberhard Kahl, Hemmingen, Germany

[73] Assignee: Bosch, Robert, GmbH, Stuttgart, Germany

[22] Filed: Oct. 8, 1971

[21] Appl. No.: 187,759

[30] Foreign Application Priority Data
Oct. 9, 1970  Germany.................. P 20 49 676.8

[52] U.S. Cl................ 180/79.1, 46/212, 46/244 R, 180/97
[51] Int. Cl............................................. B62d 5/04
[58] Field of Search...................... 180/97, 79, 79.1; 46/244 R, 212

[56] References Cited
UNITED STATES PATENTS

| | | | |
|---|---|---|---|
| 2,751,995 | 6/1956 | Kastory.................................. | 180/97 |
| 3,393,762 | 7/1968 | Matson................................. | 180/79 |
| 1,094,901 | 4/1914 | Holzman............................. | 180/97 |
| 3,252,247 | 5/1966 | Miller............................ | 180/79.1 X |

FOREIGN PATENTS OR APPLICATIONS

| | | | |
|---|---|---|---|
| 1,530,838 | 4/1964 | Germany............................ | 180/97 |

*Primary Examiner*—Gerald M. Forlenza
*Assistant Examiner*—George F. Abraham
*Attorney*—Michael S. Striker

[57] ABSTRACT

An automatically steered self-propelled vehicle for movement over the unobstructed portions of an area having obstructions includes a vehicle frame having wheels mounted thereon and a sensing rail mounted on the frame. The sensing rail is displaceable relative to the frame between a normally extended position and a retracted position upon being urged against an obstruction by the vehicle. A reversible driving motor is connected to the wheels for rotating the wheels in a forward and a reverse direction. A reversible steering motor is connected to the wheels for displacing the same between a normally straight and a sideward position oriented 90° from the straight position. A storage device for monitoring the distance travelled by the vehicle in the lateral direction is connected to the steering motor and to the driving motor for regulating the operation of these two motors. The steering motor is rotatable in one direction to cause the wheels to be displaced to the sideward position in response to the sensing rail achieving the retracted position and the steering motor is rotatable in the other direction to cause the wheels to return to the straight position in response to the sensing rail achieving the extended position. The driving motor is rotatable in one direction to cause the vehicle to move in the forward direction when the wheels are in the straight position and the steering motor is rotatable in the other direction in response to the regulation by the control device and to the wheel positions. The steering motor is adapted to rotate either in the forward or in the reverse directions in response to the wheels returning to the straight position from the lateral position. Upon meeting an obstruction, the vehicle moves laterally and substantially along the surface of the obstruction, up to a maximum of the width of the vehicle, the wheels straightening out either in response to the sensing rail again achieving the fully extended position or the vehicle having moved laterally the maximum amount corresponding to the width of the vehicle.

9 Claims, 2 Drawing Figures

United States Patent [19]
Kahl
[11] 3,750,833
[45] Aug. 7, 1973
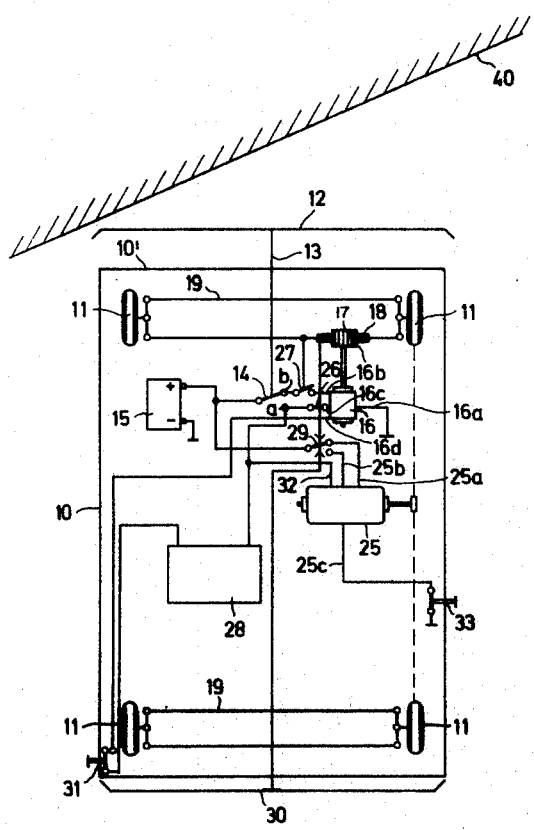

AUTOMATICALLY STEERED SELF-PROPELLED VEHICLE

CROSS-REFERENCES TO RELATED APPLICATIONS

The apparatus of the present invention constitutes an improvement over and a further development of the apparatus disclosed in the copending application Ser. No. 137,354 filed by Wolfram Müller on Apr. 26, 1971 and owned by the assignee of the present case.

BACKGROUND OF THE INVENTION

The present invention relates to an unmanned vehicle for treating the unobstructed part of an area having obstructions preventing continued movement of the vehicle.

It has been known to employ automatically steered self-propelled vehicles in the past. However, these have usually involved the use of underground rails which have either directly guided the vehicles or coupled electrically with the vehicle whereby the vehicle detected the presence of the rail beneath the ground. The use of such vehicles, however, has presented problems. The requirement for embedding a rail system beneath the ground has been costly. Such rail systems have also proved to be inflexible in that once the rail network has been laid, it has been difficult to alter or change the course of the vehicle without expending additional effort and money. This has caused such vehicles to be used sparingly where the amount and type of obstructions in an area has fluctuated considerably, such as in warehouses.

An automatically steered self-propelled vehicle which has overcome the disadvantages of the above-described prior art is described in the above-cross-referenced application. The invention there disclosed utilizes a pluraltiy of sensors in the front of the vehicle for sensing the shape of the obstruction and for modifying the directions of the vehicle accordingly in order to avoid and to circumvent the obstruction so that the entire surface area is covered. However, the use of a plurality of sensors as there described and the associated circuitry gives rise to a complicated apparatus. Being complex, the vehicle is expensive to manufacture and to maintain and may be subject to frequent breakdowns rendering the vehicle inoperative.

SUMMARY OF THE INVENTION

It is one object of the invention to provide an automatically steered self-propelled vehicle which is simple in construction and economical to build and is capable of moving over areas having obstructions.

Another object of the invention is to provide an automatically steered self-propelled vehicle which will recognize the boundaries of an obstruction by the use of a single sensor, and automatically steer around the obstruction.

With these objects in view, the present invention provides an automatically steered self-propelled vehicle for movement over the unobstructed portions of an area having obstructions, comprising a vehicle frame and wheels mounted on said frame. A sensing rail is mounted on said frame and displaceable relative thereto between a normally extended position and a retracted position upon being urged against an obstruction by said vehicle. Drive means is connected to said wheels for rotating said wheels to thereby impart motion to said vehicle frame. Steering means is connected to said wheels for displacing the same between first and second positions in which said vehicle frame respectively moves in a first direction and a second direction inclined to said first direction. Control means is connected to said steering means and to said drive means for regulating operation of these two latter means. Switching means are connected to said sensing rail for activating said steering means in response to movement of said sensing rail to said retracted position upon engagement with an obstruction.

According to a presently preferred embodiment, the steering means comprises a reversible motor, the motor being rotatable in one direction to cause the wheels to be displaced to the second position in response to the sensing rail achieving said retracted position and the motor being rotatable in the other direction to cause the wheels to return to the first position in response to the sensing rail achieving said extended position. Also, the drive means comprises a reversible motor, the motor being rotatable in one direction to cause the vehicle to move in the forward direction when the wheels are in the first position and the motor being rotatable in the other direction in response to the regulation by the control means and to the wheel positions. The driving motor is adapted to either continue in the forward direction or to reverse directions in response to the wheels returning to the first or straight position from the second or lateral position. The control means includes a storage device for monitoring the distance travelled by the vehicle in the sideward direction with the sensing rail in the retracted position, said storage device being adapted to cause resumption of the movement in the first direction either in response to said sensing rail assuming said extended position or when said vehicle has moved a distance corresponding to said predetermined width in the lateral direction independently of the position of the sensing rail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
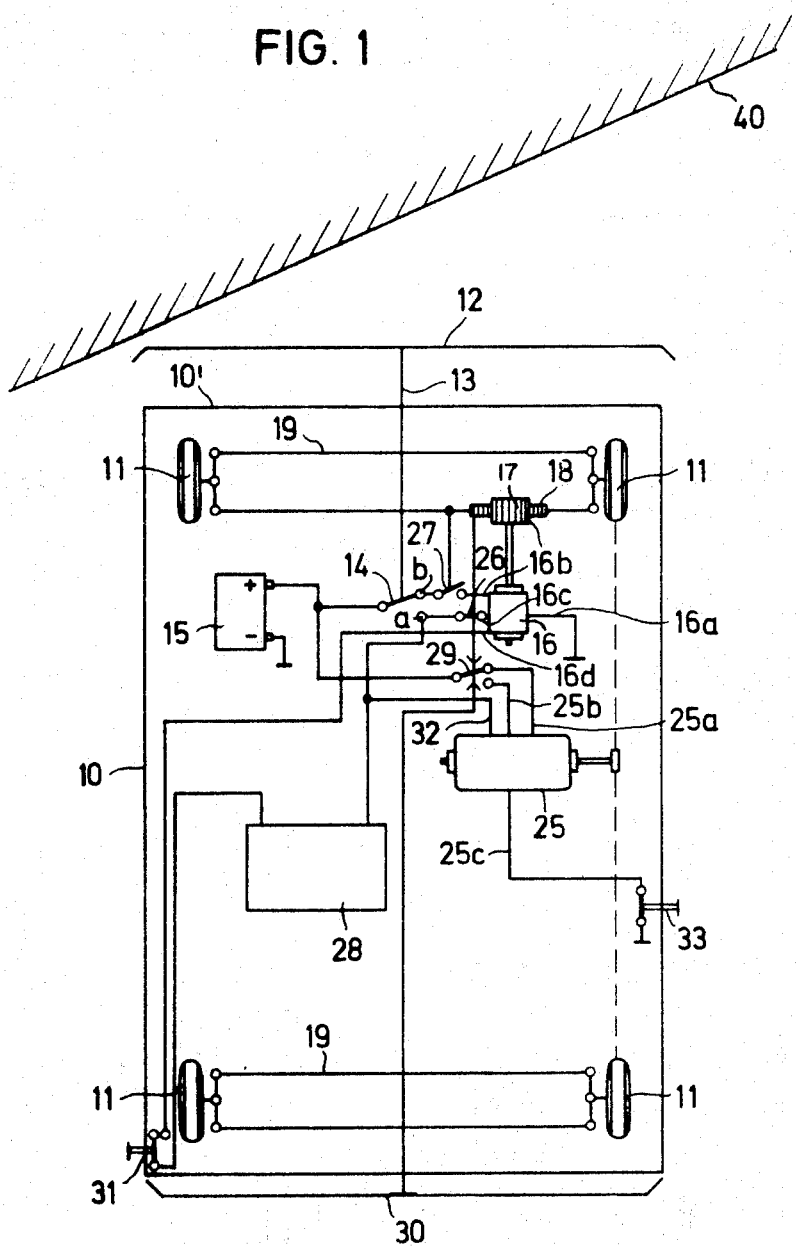
FIG. 1 is a schematic view of an automatically steered self-propelled vehicle according to the present invention.

Referring to the drawings, in which like reference numerals are used to designate like parts throughout, and looking first at FIG. 1, a vehicle frame 10 is mounted on wheels 11, said vehicle frame carrying the circuitry according to the present invention for making the vehicle automatically steered and self-propelled, as will hereafter be described. The vehicle may also carry rotary-sweeping brushes (not shown) for cleaning the unobstructed portion of the area. The vehicle has a front end portion 10' which defines the forward direction of movement of the vehicle. A sensing rail 12 is mounted on the vehicle frame 10 and is displaceable relative thereto between a normally extended position and a retracted position upon being urged against an obstruction by the vehicle. The sensing rail 10 is connected to a rod 13 which may be slidably mounted on the vehicle frame and whose longitudinal movements are thus a function of the movements of the sensing rail 12. The rod 13 is operatively connected to the moving contact of a switch 14. The switch 14 has two stationary contacts a and b. In the normally extended position of the sensing rail 12, the moving contact of the switch 14 is engaged with stationary contact b as shown in FIG. 1. Switch 14 is selected to have a large hysteresis, whereby the moving contact of the switch 14 does not move from one contact to the other except when the sensing rail 12 achieves a fully extended or fully retracted position. Accordingly, the moving contact of the switch 14 remains in its position during the transitory states of the sensing rail 12 while moving from a fully extended position to a fully retracted position, or vice versa. The stationary contact of the switch 14 is connected to the positive terminal of a vehicle battery 15, the negative terminal of said battery being connected to a common ground shared by the vehicle and the electrical circuitry.

Figure 2:
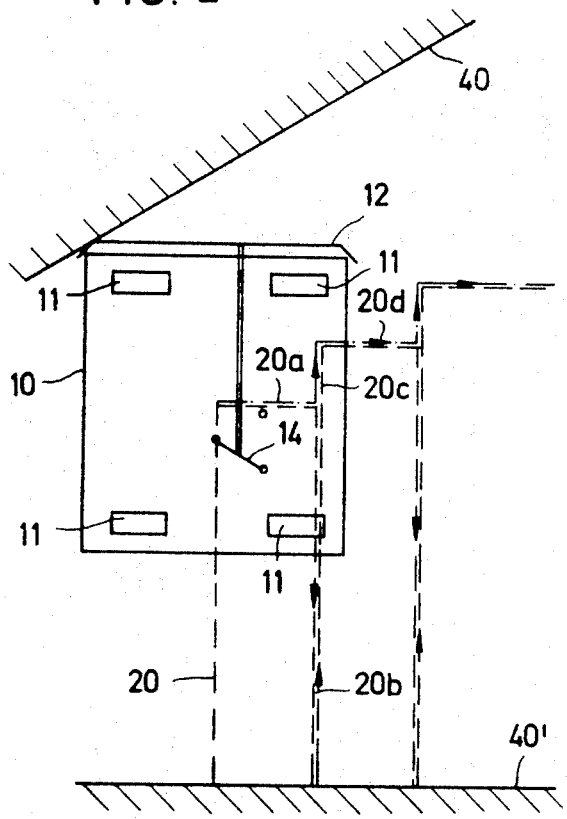
FIG. 2 is a schematic view of a vehicle showing possible movements of the vehicle in response to meeting a boundary surface.

Steering means 16, such as a reversible motor, is shown to be coupled to a pinion gear 17. The pinion gear 17 is engaged or meshed with gear rack 18, gear rack 18 being movable along its longitudinal axis in response to pivotal rotation of the wheels 11 about suitable linkage 19. The reversible motor 16 is rotatable in one direction to cause the wheels to be displaced to inclined positions from the straight position shown in FIG. 1 in response to the sensing rail 12 achieving said retracted position. The reversible motor 16 is rotatable in the other direction to cause the wheels 11 to return to the straight position shown in FIG. 1 in response to the sensing rail 12 achieving said extended position. Although the steering motor 16 can pivot the wheels 11 to any intermediate position, the presently preferred embodiment provides that the wheels 11 are rotated between the straight position shown in FIG. 1 and a side or lateral position which is oriented in 90° from the straight position as shown in FIG. 2. The steering motor 16 has four leads 16a–16d which are provided for electrically activating and regulating the operation of the steering motor 16. Lead 16a is the ground lead and is connected to the system common ground. Lead 16b is shown connected to a contact of switch 27. The lead 16c is connected to a contact of switch 26 and lead 16d is connected to a contact of switch 31. The means by which the steering motor 16 is activated and controlled will be described hereafter.

A reversible driving motor 25 is shown to be connected to the wheels 11 for rotating the wheels to thereby impart motion to the vehicle frame 10. Any conventional means may be utilized for connecting the driving motor 25 and the wheels 11 for driving the same. Thus, a drive chain is suitable for this purpose. However, because this means is not critical for the present invention, this has been shown in FIG. 1 by a dashed line. The driving motor is rotatable in one direction to cause the vehicle to move in the forward direction when the wheels are in the straight position and it is rotatable in the other direction in response to regulation by the control device, to be described hereafter, and to the wheel positions. Driving motor 25 is shown to have a plurality of leads 25a, 25b, 25c and 32, these leads operable for accepting electrical signals which activate and control the operation of the driving motor 25. Thus, the leads 25a and 25b are shown to be connected to the stationary contacts of a switch 29. Leads 25c is connected to a contact of stop switch 33, to be discussed more fully hereafter. Lead 32 of driving motor 25 is connected both to the storage device 28 and the stationary contact a of the switch 14.

The last main component of the automatically steered self-propelled vehicle consists of a storage device, including counters and timers, said circuits being conventional and known in the art for accomplishing the functions which are to be described. The control device 28 is connected to the driving motor 25 and to the steering motor 16 as well as to one of the contacts of lateral sensor 31.

To describe the operation of the vehicle, it will be assumed that the vehicle is moving in a forward direction in an area having obstructions. The obstructions project above the surface of the area and would obstruct the movement of the vehicle frame 10. FIG. 1 illustrates the vehicle frame 10 just prior to the sensing rail 12 coming into contact with an obstruction boundary 40. The vehicle is capable of sensing arbitrarily shaped obstruction boundaries and moving around these obstructions as will be described hereafter. Prior to contact between the sensing rail 12 and the obstruction boundary 40, the switches 14, 26, 27, and 29 are in the positions as shown, these being defined as the normal positions of said switches.

When the sensing rail 12 meets the obstruction boundary 40 while the vehicle is still advancing, the rod 13 will act upon switch 14, which has a high hysteresis as described above. Because of this, the moving contact of switch 14 will remain in position b until the sensing rail is in a fully retracted position as shown in FIG. 2. Upon reaching the fully retracted position, the moving contact of switch 14 will move from contact b to contact a. Switch 26 being normally closed, the movement of the moving contact of switch 24 to stationary contact a places the positive terminal of the battery 15 in contact with the lead 16c of the steering motor 16. The steering motor 16, upon being activated, rotates pinion gear 17 which is meshed with gear rack 18 to thereby act upon linkages 19. Wheels 11 are pivotally mounted for rotational displacement in response to the movement of the linkages 19. By placing the battery voltage across the lead 16c the steering motor rotates in a direction to cause the wheels to be rotationally displaced to a position which is 90° removed from the initially straight position, as shown in FIG. 2. Switches 26, 27 and 29 are shown mechanically coupled to the linkages 19. These mechanical connections, to the moving contact of said switches, are operative for opening and closing said switches under various conditions as will hereafter be described. Thus, switch 26, which is normally closed, remains closed until the wheels 11 have attained their 90° rotation at which time said switch 26 opens. The effect of this is to remove the voltage applied by the battery 15 from the lead 16c to thereby prevent further displacement of the wheels 11. Thus, once the wheels 11 have been placed into an appropriate sideward position these wheels are left in that position until further events still to be described take place. On the other hand, switch 27 which is shown in the open condition in FIG. 1 closes as soon as the wheels deviate from their straight position shown in FIG. 1. However, since the moving contact of switch 14 is engaged with contact *a* rather than contact *b*, as a result of the retracted position of the sensing rail 12 as explained above, no voltage is applied to any of the leads under these conditions to the steering motor 16. Since nothing has yet taken place which would modify the direction of rotation of the driving motor 25, the driving motor is still operative to rotate the wheels in a forward direction or in the same direction as the wheels were turning when the vehicle was first approaching obstruction boundary 19, as illustrated by path 20 in FIG. 2. However, the wheels 11 now having been displaced to the position as shown in FIG. 2, the vehicle frame 10 moves in a lateral direction as generally shown by path 20a in FIG. 2.

The storage device 28 contains well known electrical circuitry, such as counters and other memory units, which can store information and produce activating signals when certain conditions have been met. Thus, storage device 28 can be directly coupled either to the wheels 11, the driving motor 25 and the steering motor 16 for monitoring the lateral distance, such as along path 20a, for future reference use. Thus, if the speed of rotation of the wheels 11 is controlled, then the lateral velocity of the vehicle frame 10 is constant and the storage device 28 can record the time interval over which the vehicle frame 10 moves in said lateral direction. On the other hand, storage device 28 can include a device for directly measuring and converting into electrical signals the distance over which the vehicle moves in a lateral direction. In fact, the storage device 28 can contain and utilize both as will hereafter be explained. Referring to both FIGS. 1 and 2, it will be noted that as the vehicle frame 10 moves in a lateral direction, the sensing rail 12 will be released after a predetermined amount of lateral movement has taken place. Since this vehicle is intended to sense obstructions having arbitrary boundary surfaces, the vehicle as presently described, through the storage device 28, can continue to move in a lateral direction until the sensing rail 12 is no longer acted upon by the boundary surface 19 and is therefore permitted to attain its fully extended position or until a predetermined period of time has elapsed, which period of time corresponds to a distance equivalent to the width of the vehicle which the vehicle would have laterally traversed under normal conditions in that time interval. In this manner, should the vehicle come to the end of a boundary, for example, the sensing rail 12 will most likely be released before the vehicle has traversed a distance equivalent to the width of the vehicle. At such time, the vehicle will proceed in a lateral direction as described above. If, however, the vehicle has already moved the width of the vehicle and the sensing rail 12 is still in a retracted position, then the storage device 28 acts upon the steering motor 16 and the driving motor 25 in a manner to be described.

First treating the case where the vehicle has come to the end of a boundary, such as that shown in FIGS. 1 and 2, and wherein sensing rail 12, in response to lateral movement along path 20a, has again achieved its fully extended position, the moving contact of switch 14 returns from contact *a* to its original position at contact *b*. The switch 27 having closed as a result of movement of the wheels 27 away from their straight position, the return of the moving contact of switch 14 to contact *b*, connects the battery 15 with the lead 16b of the steering motor. The effect of placing the battery voltage across lead 16b is to cause the steering motor 16 to rotate in a direction opposite to that when the voltage was connected at contact *a*. The reverse rotation of the steering motor 16 causes the pinion gear 17 and the gear rack 18 to operatively move the linkages 19, and therefore the wheels 11, to their initial positions as shown in FIG. 1. The effect of the wheels returning to their originally straight position is several-fold. First, the switch 26, which had opened when the wheels 11 had attained their 90° rotation, closes again to its normal position as shown in FIG. 1. Also, switch 27 which had closed when the wheels were displaced from their originally straight direction opens when the wheels 11 attain their originally straight positions. Thus, the effect of switch 27 opening is to prevent rotation of the wheels 11 after they are in their straight positions by removing the voltage from battery 15 which would normally be applied to the lead 16b with the position of switch 14 as shown in FIG. 1. The opening of switch 27 when the sensing rail is in the fully extended position serves the same purpose as opening of the switch 26 when the sensing rail is in the fully retracted position. This purpose is to break the contact between the battery 15 and the steering motor 16 once the desired position of the wheels 11 has been achieved. Simultaneously with the closing of the switch 26 and the opening of the switch 27, the wheel apparatus, which is mechanically connected to the moving contact of the switch 29, is effective in moving the moving contact from the lead 25a to the lead 25b. This has the effect of reversing the direction of rotation of the driving motor 25 as soon as the wheels 11 have again attained their straight position. Accordingly, the vehicle frame 10 proceeds along a path generally shown in FIG. 2 as 20b. It is also possible, if so desired, to adjust the switch 29 or the storage device 28 to thereby prevent the reversal of the directions of rotation of the driving motor 25, in which event the vehicle frame 10 would proceed not along the path 20b but along the path 20c as shown in FIG. 2. However, for the purpose of the present description, the presently preferred embodiment will be adjusted to follow the path 20b in order to result in a scanning action over the entire area over which the vehicle traverses.

With the wheels 11 in the straight position and with the driving motor 25 rotating in a direction reverse to the normal direction, the vehicle frame 10 will proceed along the path 20b as described above until it reaches the region of the obstruction boundary 40'. Referring to FIG. 1, the vehicle frame 10 is shown to have a rear sensor 30, this sensor taking on any of a variety of forms, the exact forming not being critical for the purposes of the present invention. Shown in FIG. 1 is the rear sensor 30 in the form of a sensing rail similar to the sensing rail 12. However, it is equally within thee scope of the present invention to utilize one or more discrete sensing switches for the sensor of the vehicle frame 10 or in the corners thereof, without deviating from the important features of the invention. When the rear sensor 30 comes into contact with the obstruction boundary 40' the rear sensor is depressed. The rear sensor 30 is shown connected to the switch 29, the rear sensor 30 being effective when depressed to move the moving contact of switch 29 to its normal position shown in FIG. 1 to thereby return the direction of rotation of the driving motor 25 from the reverse direction to the normally forward direction. Accordingly, the wheels 11 still being oriented in a straight position, the vehicle proceeds along the path 20b in a direction towards the obstruction boundary 40. When the vehicle frame comes into contact with the obstruction boundary 40, the same sequence of events as were described in connection with the vehicle approaching said boundary along the path 20, will take place to again laterally move the vehicle along path 20d.

It now becomes clear that the vehicle will effectively slide along the surfaces of a boundary with which it comes into contact by moving in a lateral direction, the vehicle repeatedly reversing directions to cover the entire area on one side of the boundary after it has moved a predetermined distance, usually the distance equivalent to the width of the vehicle, as described above.

As described above, the storage device 28 registers the total distance which the vehicle has laterally traversed across a boundary surface of an obstruction. Once the vehicle has passed the obstruction, and since the vehicle moves in the direction from left to right as presently described, the vehicle will pass an end portion of the obstruction on the left side of the vehicle. When the vehicle moves alongside the obstruction, the lateral sensor 31 becomes engaged. When the vehicle has passed the obstruction, the lateral sensor 31 is operative to connect the storage device 28 both to the steering motor 16 and to the driving motor 25. The lateral sensor 31 has a projecting actuator, preferably constructed as a microswitch, which engages the lateral surface of the obstruction as disclosed, but when vehicle 13 has passed the obstruction, the sensor is again released by the lateral surface of the obstruction and the actuator moves again transversely to open the lateral sensor 31. In this manner, information is transmitted to the storage device 28 that the obstruction has been passed, and the control device 28 energizes the steering motor 16 to rotate the wheels to their 90° positions while simultaneously the storage device 28 reverses the normal direction of rotation of the driving motor 25. In this manner, the vehicle moves behind the obstruction for a distance determined by the storage device 28, this being a function of the distance which the vehicle travelled in a lateral direction along the obstruction on the other side of the obstruction. After the vehicle has moved behind the obstruction a distance equivalent to the width of the obstruction as recorded in the storage device 28, the storage device 28 is effective to activate the steering motor 16 to return the wheels 11 to their straight position and to again reverse the direction of rotation of the motor 25 to thereby cause forward motion of the vehicle, not unlike the motion along the path 20. Similar scanning action will take place on the other side of the boundary as was described in relation to the first side shown in FIG. 2.

A stop switch 33 is shown connected to the driving motor 25. This stop switch 33 is effective to shut off the driving motor 25 in the event that the vehicle frame 10 moves into an obstruction on the side of the vehicle as it is proceeding in a lateral direction. Alternately, the stop switch 33 can be integrated with the storage device 28, whereby the storage device 28 activates the steering motor 16 to return the wheels 11 to their straight positions so that the vehicle can move along the obstruction on the right side of the vehicle which prevents its further movement in that direction.

It will be understood that each of the elements described above, or two or more together, may also find a useful application in other types of automatically steered self-propelled apparatus differing from the types described above.

While the invention has been illustrated and described as embodied in an automatically steered self-propelled vehicle for movement over the unobstructed portions of an area having obstructions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims:

1. Automatically steered self-propelled vehicle for movement over the unobstructed portions of an area having obstructions, comprising a vehicle frame; wheels mounted on said frame; a sensing rail mounted on said frame and displaceable relative thereto between a normally extended position and a retracted position upon being urged against an obstruction by said vehicle; drive means comprising a first reversible motor and connected to said wheels for rotating said wheels in a first and in a second direction opposite to the first direction to thereby impart a corresponding movement to said vehicle frame; steering means comprising a second reversible motor connected to said wheels for displacing the same between a first position and a second position displaced through 90° from said first position; control means connected to said first and second reversible motors for regulating operation of the same; and switching means connected to said sensing rail and said second reversible motor for rotating said second reversible motor in one direction to cause said wheels to be displaced to said second position when said sensing rail reaches said retracted position, and said second reversible motor being rotatable in the other direction to cause said wheels to return to said first position when said sensing wheel reaches said extended position, said first reversible motor being rotatable in said first direction when said wheels are in said first position and said first reversible motor being rotatable in said second direction opposite to said first direction in response to regulation by said control means and to said wheel position, said first reversible motor being adapted to rotate in one of said directions in response to said wheels returning to said first position from said second position.

2. Automatically steered self-propelled vehicle as defined in claim 1, wherein said frame has a front end portion and said first direction corresponds to the forward direction of said vehicle relative to said front end portion, said wheels normally being in said first position for directing said vehicle in said forward direction.

3. Automatically steered self-propelled vehicle as defined in claim 2, wherein said sensing rail is mounted on said front end portion.

4. Automatically steered self-propelled vehicle as defined in claim 1, wherein said steering means comprises rack and pinion means connected to said wheels.

5. Automatically steered self-propelled vehicle as defined in claim 2, wherein said first reversible motor is adapted to rotate in said first direction in response to said wheels returning to said first position from said second position.

6. Automatically steered self-propelled vehicle as defined in claim 2, wherein said first reversible motor is adapted to rotate in the second direction in response to said wheels returning to said first position from said second position.

7. Automatically steered self-propelled vehicle as defined in claim 1, wherein said switching means comprises a switch having a large hysteresis, whereby said switch does not activate said control means until said sensing rail is in at least one of the fully extended and fully retracted states.

8. Automatically steered self-propelled vehicle as defined in claim 7, wherein electrical terminals are provided for application of a voltage to one of said terminals for causing rotation of said second motor in a corresponding direction, said switch having a moving contact adapted to be connected to a source of voltage and operatively connected to said sensing rail for movement therewith, and two stationary contacts each connected to another of said terminals and engageable with said moving contact in response to movement of the latter, whereby the direction of said motor is a function of the position of said sensing rail.

9. Automatically steered self-propelled vehicle of a predetermined width for movement over the unobstructed surface of an area having obstructions, comprising a vehicle frame; wheels mounted on said frame; a sensing rail mounted on said frame and displaceable relative thereto between a normally extended position and a retracted position upon being urged against an obstruction by said vehicle; drive means connected to said wheels for rotating the same to thereby impart motion to said vehicle frame; steering means connected to said wheels for displacing the same between first and second positions in which said vehicle frame respectively moves in a first direction and a second direction inclined to said first direction; control means connected to said steering means and to said drive means for regulating operation of these two latter means, said control means including a storage device for monitoring the distance travelled by said vehicle in said second direction with said sensing rail in said retracted position, said storage device being adapted to cause resumption of movement of said vehicle in said first direction when said vehicle is moved a distance corresponding to said predetermined width in said second direction independently of the position of said sensing rail; and switching means connected to said sensing rail and said steering means for activating the latter in response to movement of said sensing rail to said retracted position upon engagement with an obstruction.

* * * * *